United States Patent
Taguchi et al.

(10) Patent No.: US 12,152,960 B2
(45) Date of Patent: Nov. 26, 2024

(54) FAILURE DIAGNOSIS DEVICE FOR REDUCTION GEAR, METHOD OF DIAGNOSING FAILURE, AND MECHANICAL APPARATUS PROVIDED WITH THE FAILURE DIAGNOSIS DEVICE

(71) Applicant: KAWASAKI JUKOGYO KABUSHIKI KAISHA, Kobe (JP)

(72) Inventors: Tetsuya Taguchi, Kakogawa (JP); Shinji Kitamura, Kako-gun (JP); Makoto Kawai, Akashi (JP); Tetsuo Kaneda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 356 days.

(21) Appl. No.: 16/474,477

(22) PCT Filed: Dec. 27, 2017

(86) PCT No.: PCT/JP2017/046908
§ 371 (c)(1),
(2) Date: Jun. 27, 2019

(87) PCT Pub. No.: WO2018/124182
PCT Pub. Date: Jul. 5, 2018

(65) Prior Publication Data
US 2019/0339161 A1 Nov. 7, 2019

(30) Foreign Application Priority Data
Dec. 27, 2016 (JP) ................. 2016-253970

(51) Int. Cl.
*G01M 13/021* (2019.01)
*B25J 19/00* (2006.01)

(52) U.S. Cl.
CPC ....... *G01M 13/021* (2013.01); *B25J 19/0095* (2013.01)

(58) Field of Classification Search
CPC .. G01M 13/021; G01M 13/02; B25J 19/0095; B25J 19/06
See application file for complete search history.

(56) References Cited

U.S. PATENT DOCUMENTS

| | | |
|---|---|---|
| 2008/0215292 A1 | 9/2008 | Kato et al. |
| 2011/0022234 A1* | 1/2011 | Meyer ............... F16H 57/01 700/275 |

(Continued)

FOREIGN PATENT DOCUMENTS

| | | |
|---|---|---|
| JP | 2008-032477 A | 2/2008 |
| JP | 2015-227889 A | 12/2015 |
| JP | 2016-179527 A | 10/2016 |

*Primary Examiner* — Matthew G Marini
*Assistant Examiner* — Leo T Hinze
(74) *Attorney, Agent, or Firm* — Oliff PLC

(57) ABSTRACT

A failure diagnosis device for a reduction gear is a failure diagnosis device for a reduction gear provided to a mechanical apparatus driven by a motor so that the reduction gear slows down rotation power of the motor and transmits the power to an operating part of the mechanical apparatus. The device identifies an acceleration/deceleration period during which operation of the mechanical apparatus accelerates and/or decelerates, and determines whether the reduction gear indicates a sign of failure based on a change in frequency spectrum of motor current with respect to a change in a rotation speed of the motor during the acceleration/deceleration period.

13 Claims, 9 Drawing Sheets

(56) References Cited

U.S. PATENT DOCUMENTS

2015/0328774 A1* 11/2015 Yajima .................. B25J 9/1674
　　　　　　　　　　　　　　　　　　　　　700/261
2016/0279794 A1　　9/2016 Inagaki et al.
2019/0137984 A1* 5/2019 Maekawa ........... G01M 13/028

* cited by examiner

FAILURE DIAGNOSIS DEVICE FOR REDUCTION GEAR, METHOD OF DIAGNOSING FAILURE, AND MECHANICAL APPARATUS PROVIDED WITH THE FAILURE DIAGNOSIS DEVICE

TECHNICAL FIELD

The present disclosure relates to a failure diagnosis device for a reduction gear, a method of diagnosing failure, and a mechanical apparatus provided with the failure diagnosis device.

BACKGROUND ART

As one of the key factors of failure of an industrial robot, there is failure of the reduction gear. As a diagnosis device for such an abnormality of the reduction gear, it is known that, for example, a device which estimates a disturbance estimated value of the reduction gear based on a torque command and a speed feedback, and then diagnoses the abnormality of the reduction gear based on an amplitude of a specific spectrum extracted from a frequency component of the disturbance estimated value (for example, refer to Patent Document 1).

REFERENCE DOCUMENT OF CONVENTIONAL ART

Patent Document

[Patent Document 1] JP2008-032477A

DESCRIPTION OF THE DISCLOSURE

Problems to be Solved by the Disclosure

Meanwhile, the abnormality diagnosis device requires for a driven member, which is rotated by a motor, to be rotated at a constant speed. However, the constant speed period does not always exist, while a robot operates variously. Thus, in the abnormal diagnostic method, for example, before the robot starts a work, it is necessary to carry out the abnormality diagnosis, while causing the robot to perform a given operation which includes the constant speed period.

However, it is desirable to perform the abnormality (failure) diagnosis during the work of the robot in terms of the work efficiency. That is, the conventional abnormality (failure) diagnosis device has a problem that the abnormality (failure) diagnosis cannot be performed during the work of the robot. Moreover, this is a common problem to entire mechanical apparatuses provided with a reduction gear, including robots.

The present disclosure is made in view of solving such a problem, and one purpose thereof is to provide a failure diagnosis device for a reduction gear, a method of diagnosing failure, and a mechanical apparatus provided with the failure diagnosis device, capable of performing a failure diagnosis during a work of the mechanical apparatus provided with the reduction gear.

SUMMARY OF THE DISCLOSURE

In order to solve the problem, a failure diagnosis device for a reduction gear according to one aspect of the present disclosure is a failure diagnosis device for a reduction gear provided to a mechanical apparatus driven by a motor so that the reduction gear slows down rotation power of the motor and transmits the power to an operating part of the mechanical apparatus. The device identifies an acceleration/deceleration period during which operation of the mechanical apparatus accelerates and/or decelerates, and determines whether the reduction gear indicates a sign of failure based on a change in frequency spectrum of one of load current of the motor and a current value having a correlation with the load current (hereinafter, referred to as "the motor current") with respect to a change in a rotation speed of the motor during the acceleration/deceleration period. Here, "slows down rotation power of the motor" includes both of slowing down the rotation power inputted from the motor directly to the reduction gear, and slowing down the rotation power inputted from the motor indirectly to the reduction gear. Further, "transmits the power to the operating part of the mechanical apparatus" includes both of transmitting directly to the operating part of the mechanical apparatus, and transmitting indirectly to the operating part of the mechanical apparatus. Furthermore, "rotation speed of the motor" includes both of an actual rotation speed of the motor, and a physical amount having a correlation with the actual rotation speed (e.g., a rotation speed of an output shaft of the reduction gear, a rotation speed of a rotation shaft of the operating part of the mechanical apparatus driven by the motor, etc.).

According to this configuration, the acceleration/deceleration period during which the operation of the mechanical apparatus accelerates and/or decelerates can be identified. During the acceleration/deceleration period, in the change in the frequency spectrum of the motor current with respect to the change in the rotation speed of the motor, the current amplitude within a particular frequency range corresponding to the specific frequency of the reduction gear increases by resonance of the reduction gear, and presents the peak value. This peak value has the correlation with the sign of failure of the reduction gear. Therefore, it can be determined whether the reduction gear indicates the sign of failure based on the change in the frequency spectrum of the motor current data with respect to the change in the rotation speed of the motor. Therefore, the failure diagnosis can be performed during the work of the mechanical apparatus provided with the reduction gear.

The failure diagnosis device may include a rotation speed acquiring module configured to acquire the rotation speed of the motor, an acceleration/deceleration period identifying module configured to identify the acceleration/deceleration period based on the rotation speed of the motor acquired by the rotation speed acquiring module, a motor current acquiring module configured to acquire the motor current, a time series rotation speed data generating module configured to sequentially sample the rotation speed of the motor acquired by the rotation speed acquiring module during the acceleration/deceleration period, and generate a group of time series rotation speed data, a time series motor current data generating module configured to sequentially sample the motor current acquired by the motor current acquiring module during the acceleration/deceleration period, and generate a group of time series motor current data, a FFT analyzing module configured to make the group of time series motor current data correspond to the group of time series rotation speed data, conduct a frequency analysis of the group of time series motor current data, and generate the frequency spectra of the group of motor current data corresponding to the group of time series rotation speed data, an amplitude peak value extracting module configured to extract a peak value of the amplitude of the motor current within a given frequency range corresponding to a given specific frequency of the reduction gear, from the frequency spectra of the group of motor current data, and a determining module configured to compare the extracted peak value of the amplitude of the motor current with a given amplitude threshold, and determine whether the reduction gear indicates the sign of failure based on the determination result.

According to this configuration, the failure diagnosis device capable of performing the failure diagnosis during the work of the mechanical apparatus provided with the reduction gear, is suitably implemented.

The amplitude threshold may be an allowable amplitude threshold corresponding to an allowable abrasion amount threshold indicative of an acceptable limit of an amount of abrasion of the reduction gear.

According to this configuration, since the abrasion amount of the reduction gear is substantially an index for failure, the sign of failure of the reduction gear can be determined accurately.

The determination may be performed when the motor current is above a given value.

According to this configuration, when the load of the reduction gear is large, the existence of the sign of failure is determined. Since the gears mesh firmly when the load of the reduction gear is large, the peak value of the current amplitude within the particular frequency range by the resonance of the reduction gear appears more clearly. Therefore, the existence of the sign of failure can be determined more accurately.

The reduction gear may be configured so that an output shaft thereof only rotates within a rotation range less than one revolution in an operating range of the mechanical apparatus.

According to this configuration, in a case of such a reduction gear, the failure diagnosis can be performed during the work of the mechanical apparatus provided with the reduction gear.

The acceleration/deceleration period may be an acceleration period.

According to this configuration, the existence of the sign of failure is determined during the acceleration period of the operation of the mechanical apparatus. During the acceleration period, since the gears mesh firmly, the peak value of the current amplitude within the particular frequency range by the resonance of the reduction gear appears more clearly. Therefore, the existence of the sign of failure can be determined more accurately.

The acceleration/deceleration period may be a deceleration period.

Moreover, a mechanical apparatus according to another aspect of the present disclosure includes any one of the failure diagnosis devices described above.

According to this configuration, the failure determination can be performed during the work of the mechanical apparatus.

Further, a method of diagnosing failure of a reduction gear according to still another aspect of the present disclosure is a method of diagnosing failure of a reduction gear provided to a mechanical apparatus driven by a motor so that the reduction gear slows down the rotation power of the motor and transmits the power to an operating part of the mechanical apparatus. The method includes the steps of (a) identifying an acceleration/deceleration period during which operation of the mechanical apparatus accelerates and/or decelerates, and (b) determining whether the reduction gear indicates a sign of failure based on a change in frequency spectrum of one of load current of the motor and a current value having a correlation with the load current (hereinafter, referred to as "the motor current") with respect to a change in a rotation speed of the motor during the acceleration/deceleration period.

According to this configuration, the failure determination can be performed during the work of the mechanical apparatus provided with the reduction gear.

Effect of the Disclosure

The present disclosure has effects of providing the failure diagnosis device for the reduction gear, the method of diagnosing the failure, and the mechanical apparatus provided with the failure diagnosis device, capable of performing the failure diagnosis during the work of the mechanical apparatus provided with the reduction gear.

Figure 1:
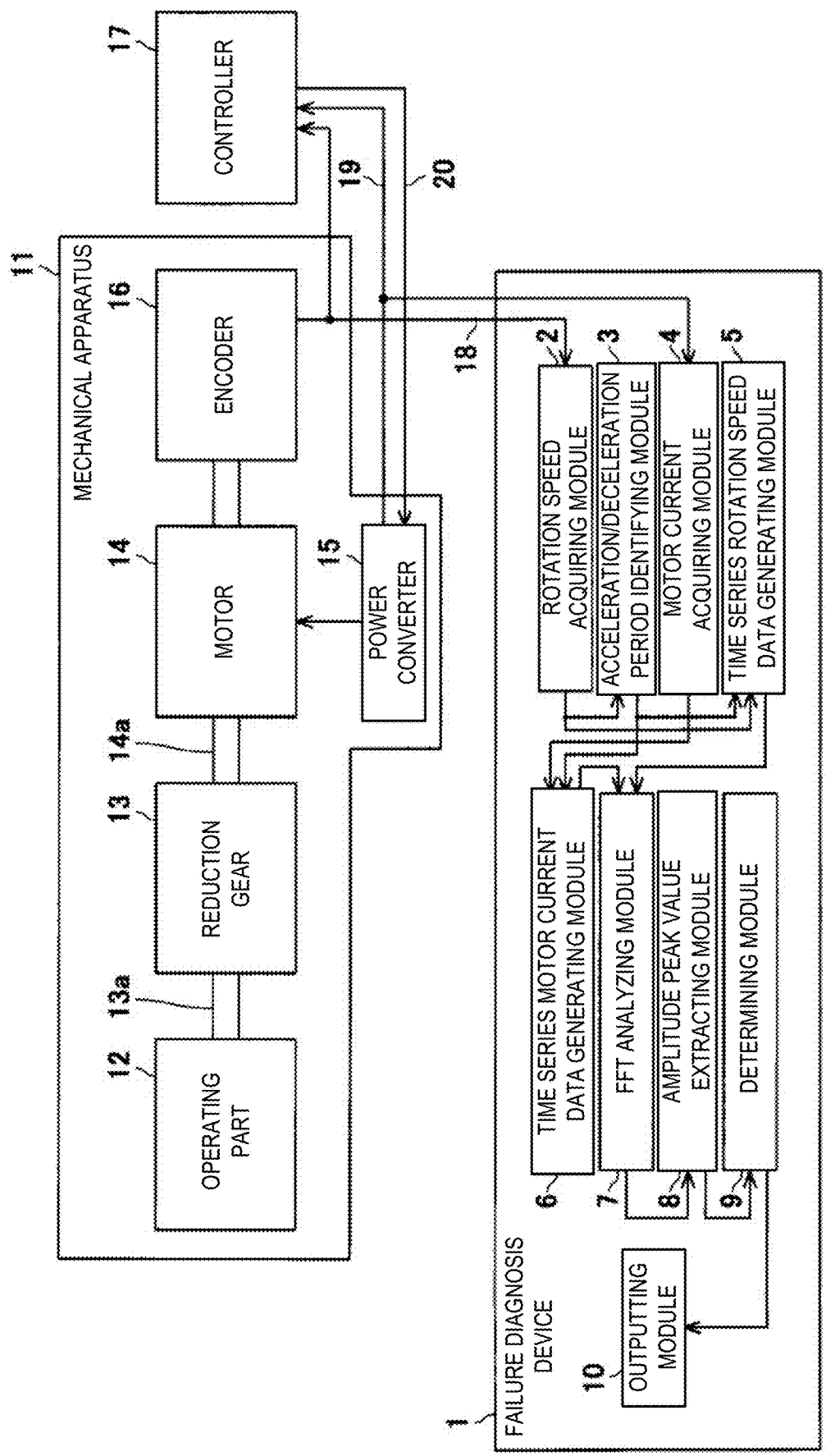
FIG. 1 is a functional block diagram illustrating a configuration of a failure diagnosis device for a reduction gear according to Embodiment 1 of the present disclosure.

MODES FOR CARRYING OUT THE DISCLOSURE (Knowledge Used as Basis of Present Disclosure)

The present inventors examined diligently in order to enable a failure diagnosis to be performed during a work of a mechanical apparatus provided with a reduction gear.

In this examination, the present inventors set a first premise to find out a failure diagnosis specialized for the reduction gear. Moreover, for example, an output shaft of a reduction gear for an industrial robot only rotates within a rotation range less than one revolution, in an operating range of the robot. Thus, the present inventors set a second premise to find out a failure diagnosis which is also effective for such a reduction gear. Further, for example, since the industrial robot is driven by a motor, and operation of the robot is controlled by controlling motor current, a sensor which detects basic data for the analysis can be omitted, if the motor current can be used as the basic data for analyzing the failure. Thus, the present inventors set a third premise to use the motor current as the basic data for analyzing the failure. Here, "motor current" is a concept on the control and includes load current of the motor, and a current value having a correlation with the load current (for example, a current instruction value outputted from a controller to a drive circuit (power converter) for the motor).

As a result of applying the trial-and-error method under these first to third premises, the present inventors found out in the industrial robot having the reduction gear in which the output shaft only rotates within the rotation range less than one revolution in the operating range of the robot, that in a change of frequency spectrum of the motor current with respect to a change in a rotation speed of the motor (refer to FIG. 2), current amplitude within a particular frequency range corresponding to the specific frequency of the reduction gear increases by the resonance of the reduction gear, and indicates a well-defined peak value (refer to FIGS. 4A to 4E). Moreover, the present inventors examined by an experiment a change in the amplitude of the motor current within the particular frequency range corresponding to the specific frequency of the reduction gear with respect to a change in concentration of iron powder in grease (hereinafter, referred to as the "iron powder concentration of grease") for the reduction gear (refer to FIGS. 4A to 4E). The iron powder concentration of the grease for the reduction gear has a relation with degradation (a sign of failure) of the reduction gear. As a result, the present inventors found out that there is a correlation between the iron powder concentration of the grease for the reduction gear, and the peak value of the amplitude of the motor current within the particular frequency range corresponding to the specific frequency of the reduction gear (refer to FIG. 5). In other words, the present inventors found out that the peak value of the amplitude of the motor current within the particular frequency range has a correlation with the sign of failure of the reduction gear.

According to these knowledge, the reduction gear can be determined whether it indicates the sign of failure based on the change in the frequency spectrum of the motor current with respect to the change in the rotation speed of the motor. Note that it is apparent that the above knowledge is also applicable to the mechanical apparatus having the reduction gear, other than the industrial robot. Moreover, it is apparent that the above knowledge is also applicable to the reduction gear of which the output shaft rotates more than one revolution in an operating range of the mechanical apparatus.

The present inventors are conceive of the present disclosure based on the above knowledge. Hereinafter, embodiments which implement the present disclosure will be described with reference to an accompanying drawing. Note that, in the following description, the same or corresponding components are denoted with the same reference characters throughout the drawings to omit redundant description.

Embodiment 1

[Configuration]

FIG. 1 is a functional block diagram illustrating a configuration of a failure diagnosis device for a reduction gear according to Embodiment 1 of the present disclosure.

Referring to FIG. 1, a failure diagnosis device 1 for the reduction gear (hereinafter, simply referred to as the "failure diagnosis device") is a failure diagnosis device 1 in which a mechanical apparatus 11 driven by a motor 14 is provided with a reduction gear 13 so that the reduction gear 13 slows down the rotation power of the motor 14 and transmits it to an operating part 12 of the mechanical apparatus 11. The failure diagnosis device 1 is configured to identify an acceleration/deceleration period during which the operation of the mechanical apparatus 11 accelerates and/or decelerates (hereinafter, simply referred to as the "acceleration/deceleration period"), and determine whether the reduction gear 13 indicates a sign of failure based on a change in frequency spectrum of the motor current of the motor 14 with respect to a change in a rotation speed of the motor 14 during the acceleration/deceleration period. Below, this will be described concretely.

First, the reduction gear 13 which is a target of diagnosis of the failure diagnosis device 1, and the mechanical apparatus 11 provided with the reduction gear 13 are described.

The mechanical apparatus 11 includes the operating part 12, the motor 14 which drives the operating part 12, the reduction gear 13 which slows down the rotation power of the motor 14 and transmits it to the processing part 12, an encoder 16 which detects a rotational position of the motor 14, and a power converter 15 which controls electric power (here, current) supplied to the motor 14 to control the rotation of the motor 14.

The mechanical apparatus 11 is an arbitrary apparatus as long as it includes the operating part 12. The mechanical apparatus 11 may typically include an industrial robot. The mechanical apparatus 11 may be, for example, a machine tool, other than the industrial robot.

The reduction gear 13 is an arbitrary reduction gear as long as it slows down the rotation power of the motor 14 and transmits it to the operating part 12. The reduction gear 13, for example, slows down the rotation power of an input shaft by a speed-reduction mechanism (not illustrated) and outputs the slowed-down rotation power to an output shaft 13a. Although a rotation shaft 14a of the motor 14 is illustrated as the input shaft in FIG. 1, it may be an output shaft of other operating parts, for example. Moreover, although a gear transmission mechanism is typically illustrated as the speed-reduction mechanism, it may be other speed-reduction mechanisms.

The motor 14 is a servo motor, but may be a brushless motor or a DC motor. However, it may be other motors, such as an induction motor. If the servo motor is used, and a position control of the operating part 12 is performed, also using the encoder 16. The installing location of the motor 14 may be a stationary part or the processing part of the mechanical apparatus 11. In the case of the industrial robot, since the motor 14 is provided in each joint to drive a tip-end-side arm member of the joint, except for the first joint, the motor 14 is provided to the processing part in the joints other than the first joint. In the first joint, the motor 14 is provided to the stationary part.

The encoder 16 is provided to the rotation shaft 14a of the motor 14. The encoder 16 is an arbitrary encoder as long as it detects the rotation angle (rotational position) of the motor 14. Note that, if the motor 14 is comprised of the induction motor and the position control of the operating part 12 is not performed, a rotation speed detector may be used, instead of the encoder 16, for example.

The power converter 15 supplies the electric power of which voltage or current is controlled (current is controlled in FIG. 1) to the motor 14 to drive the motor 14. Since the power converter 15 is well-known in the art, the concrete description is omitted. In FIG. 1, the power converter 15 is provided with a current sensor (not illustrated), detects current supplied to the motor 14 (load current of the motor 14), and outputs the detected current 19 to the controller 17. The current sensor may be provided outside the power converter 15.

The controller 17 generates a current instruction value 20 based on a rotation angle of the motor 14 inputted from the encoder 16, and the motor current 19 inputted from the current sensor of the power converter 15, and outputs it to the power converter 15. The power converter 15 outputs to the motor 14 electric power with current according to the current instruction value 20. In this way, the controller 17 carries out a feedback control of the rotation angle and torque of the motor 14.

Next, the failure diagnosis device 1 is described.

The failure diagnosis device 1 is comprised of an arithmetic unit. The arithmetic unit includes, for example, a personal computer and a micro controller which operate according to a program (software), and hardware, such as a logic circuit, and an electronic circuit. Here, the failure diagnosis device 1 is comprised of a processor which operates according to the program. The failure diagnosis device 1 (processor) includes a processing part and a memory part. The processing part reads and executes a given failure diagnosis program stored in the memory part to perform a given failure diagnosis. The failure diagnosis device 1 includes a rotation speed acquiring module 2, an acceleration/deceleration period identifying module 3, a motor current acquiring module 4, a time series rotation speed data generating module 5, a time series motor current data generating module 6, a FFT analyzing module 7, an amplitude peak value extracting module 8, a determining module 9, and an outputting module 10.

The functional parts 2 to 9 are functional parts implemented by executing the given failure diagnosis program described above, and in fact, the processor operates as the functional parts 2 to 9.

The rotation speed acquiring module 2 acquires (and stores temporarily) the rotation speed of the motor 14 based on the rotation angle of the motor 14 inputted from the encoder 16. Note that, if the rotation speed detector is provided instead of the encoder 16, the rotation speed of the motor 14 is acquired based on the rotation speed inputted from the rotation speed detector.

The acceleration/deceleration period identifying module 3 identifies an acceleration/deceleration period based on the rotation speed of the motor acquired by the rotation speed acquiring module 2.

Here, the motor current acquiring module 4 acquires (and stores temporarily) the current instruction value 20 inputted from the controller 17 as the motor current. Note that the motor current 19 inputted from the current sensor (not illustrated) of the power converter 15 may be acquired as the "motor current." Note that the current instruction value is a command signal according to a deviation of the present value from the load current of the motor, from which a result which is not inferior to the load current of the motor can be obtained.

The time series rotation speed data generating module 5 sequentially samples the rotation speed of the motor acquired by the rotation speed acquiring module 2 during an acceleration/deceleration period, and generates a group of time series rotation speed data.

The time series motor current data generating module 6 sequentially samples the motor current acquired by the motor current acquiring module 4 during the acceleration/deceleration period, and generates a group of time series motor current data.

Here, logging (extraction) and sampling of the rotation speed data and the motor current data are described. The rotation speed acquiring module 2 and the motor current acquiring module 4 acquire the motor rotation speed and the motor current as time series data, respectively. Although it is necessary to perform the logging and the sampling of a portion of the acceleration/deceleration period for the time series data, either can be performed first. Moreover, as for the sampling, the number of sampling points in one revolution of the motor is defined and, the sampling frequency is determined according to the rotation speed of the motor so that the defined number of samplings is performed even if the rotation speed of the motor changes.

The FFT analyzing module 7 makes the group of time series motor current data correspond to the group of time series rotation speed data, conducts a frequency analysis of the group of time series motor current data, and generates frequency spectra of the group of the motor current data corresponding to the group of time series rotation speed data. This frequency analysis (hereinafter, may be referred to as a three-dimensional (3D) frequency analysis) is conducted by, for example, a FFT (Fast Fourier Transform).

Figure 2:
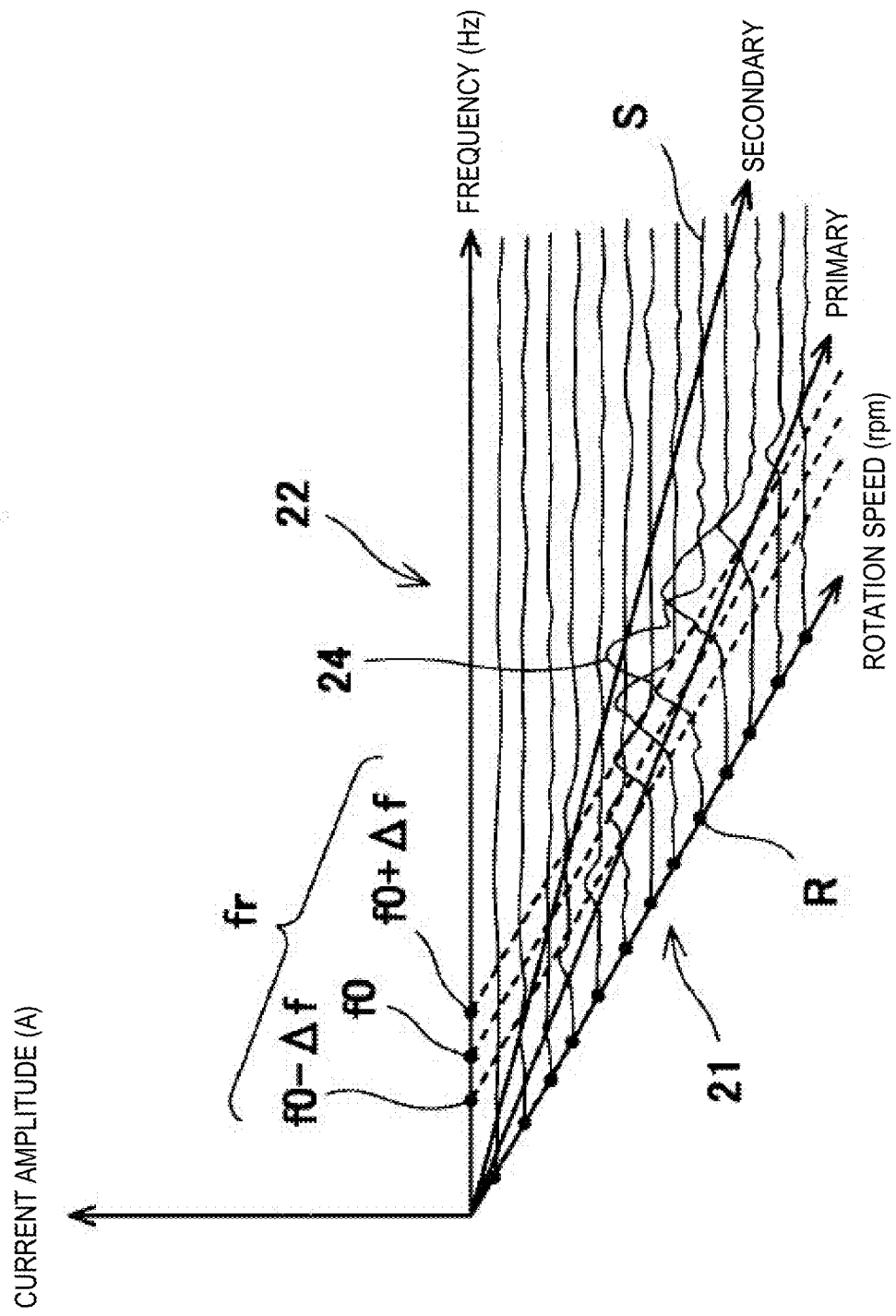
FIG. 2 is a view schematically illustrating a change in frequency spectrum of the motor current with respect to a change in a rotation speed of the motor.

FIG. 2 is a view schematically (conceptually) illustrating a change in the frequency spectrum of the motor current with respect to the change in the rotation speed of the motor, where the frequency analysis is indicated in 3D. In FIG. 2, X-axis expresses the rotation speed (rpm), Y-axis expresses the frequency (Hz), and Z-axis expresses the amplitude (A) of the motor current. On the X-axis, a group of time series rotation speed data 21 is located. The reference character R indicates each rotation speed data. Frequency spectra 22 of the group of motor current data exist corresponding to the group of time series rotation speed data 21. The reference character S indicates the frequency spectrum of each motor current data. In FIG. 2, only a primary rotation speed (basic rotation speed) and a secondary rotation speed are illustrated for simplification. The reference character f indicates a frequency, and f0 indicates a specific frequency (resonance frequency) of the reduction gear 13. A range where the frequency is $(f0-\Delta f) \leq f \leq (f0+\Delta f)$ indicates a given frequency range fr. In this given frequency range fr, the amplitude of the current in the frequency spectrum S of the motor current data increases by the resonance of the reduction gear 13, and presents a peak value 24.

Note that, in fact, a large number of rotation speed data R are located on the X-axis, and the frequency spectra S of a large number of motor current data corresponding to the rotation speed data R exist. Moreover, since the data corresponding to the acceleration/deceleration period is extracted from the time series rotation speed data during the failure diagnosis, the rotation speed data 21 may be located only in a partial range on the X-axis, and only the frequency spectrum 22 of the motor current data corresponding to the rotation speed data 21 may exist.

Referring to FIGS. 1 and 2, the amplitude peak value extracting module 8 extracts the peak value of the amplitude of the motor current within the given frequency range fr corresponding to the given specific frequency f0 of the reduction gear 13 from the frequency spectra S of the group of motor current data. The given specific frequency f0 is determined beforehand by an experiment, a simulation, calculation, etc., and is stored in the memory part (not illustrated) of the failure diagnosis device 1.

The determining module 9 compares the peak value 24 of the extracted amplitude of the motor current with a given amplitude threshold, and determines whether the reduction gear 13 indicates the sign of failure based on the determination result. Specifically, if the peak value 24 of the amplitude of the motor current is above the given amplitude threshold, the determining module 9 determines that the reduction gear 13 indicates the sign of failure, and if the peak value 24 of the amplitude of the motor current is below the given amplitude threshold, the determining module 9 determines that the reduction gear 13 does not indicate the sign of failure. This amplitude threshold is determined by an experiment, a simulation, etc. The amplitude threshold is determined so as to correspond to an allowable threshold indicative of an acceptable limit of a physical quantity (parameter) relevant to the degradation (sign of failure) of the reduction gear 13. In this embodiment, the amplitude threshold is determined so as to correspond to an allowable threshold of an iron powder concentration of grease for the reduction gear.

The outputting module 10 outputs the determination result by the determining module 9. The outputting module 10 is comprised of, for example, a display unit which displays the determination result, or an alarm, a transmitter which transmits the determination result to an external device, a printer which prints the determination result, etc.

[Operation]

Next, operation of the failure diagnosis device 1 configured as described above is described. Note that the operation of the failure diagnosis device 1 is also a method of diagnosing the failure according to Embodiment 1.

Figure 3:
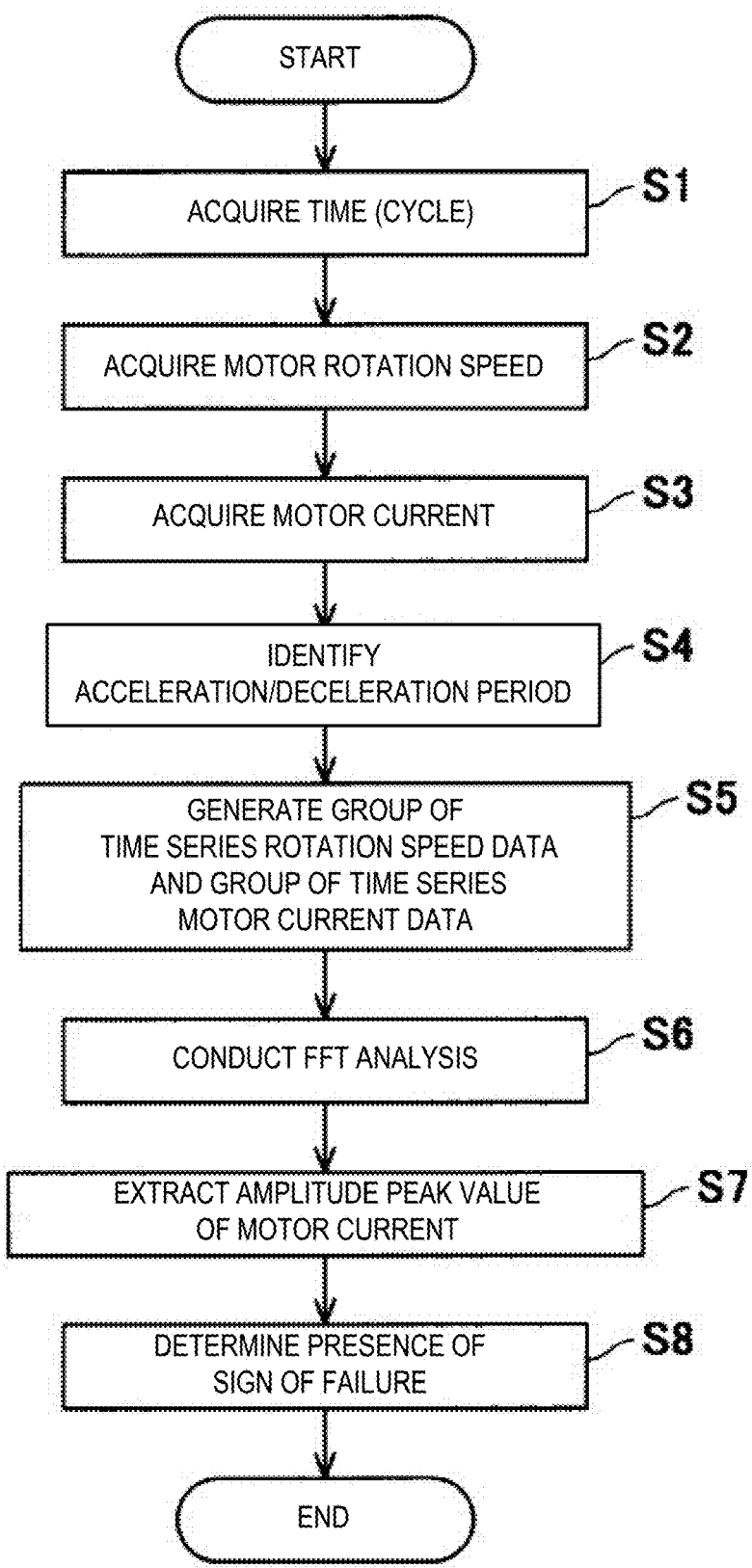
FIG. 3 is a flowchart illustrating operation of the failure diagnosis device of FIG. 1.
Figure 4A:
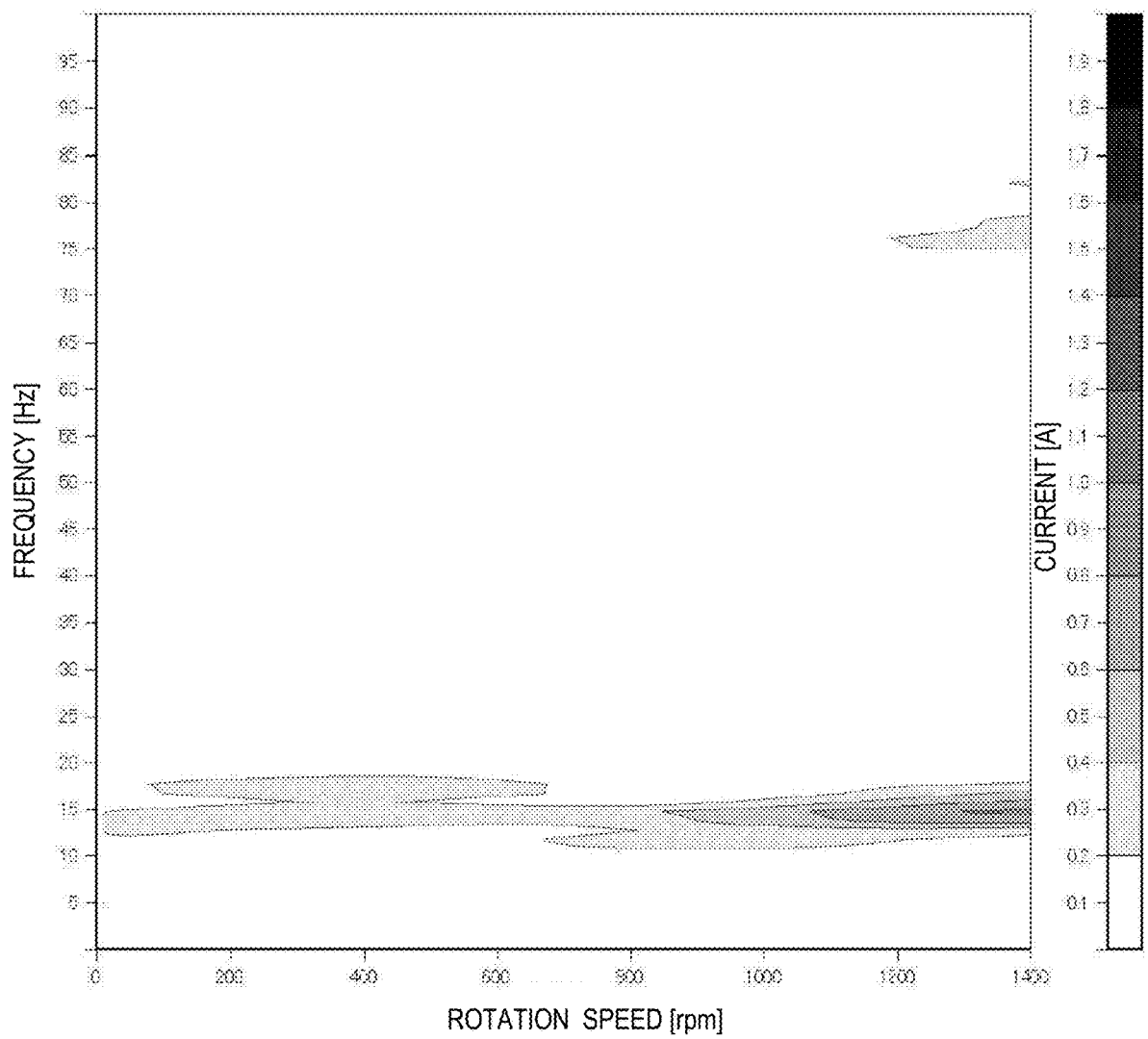
FIG. 4A is a view illustrating a correlation between a concentration of iron powder in grease for the reduction gear in a durability test and a peak value of amplitude of the motor current within a particular frequency range corresponding to the specific frequency of the reduction gear, together with FIGS. 4B to 4E.
Figure 4B:
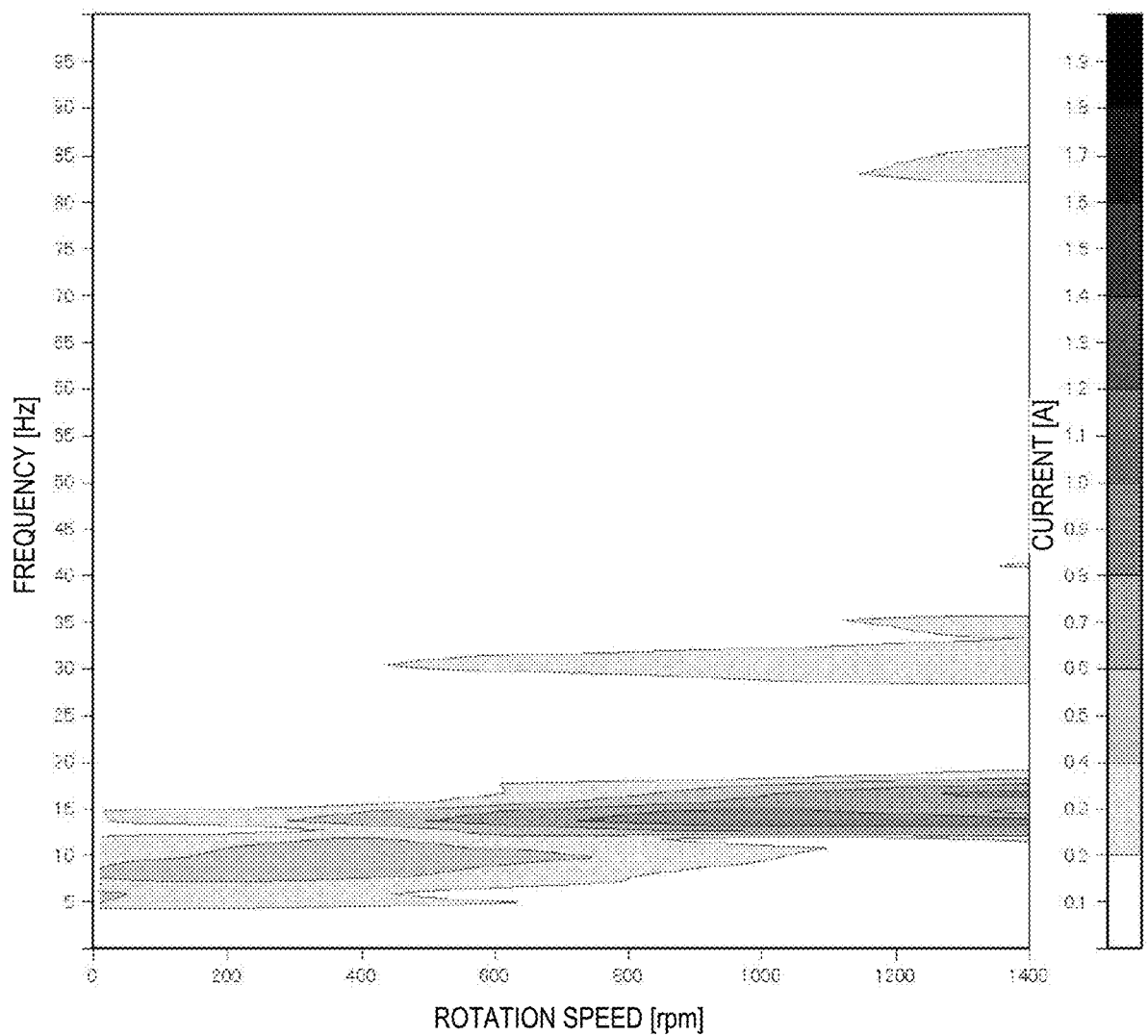
FIG. 4B is a view illustrating the correlation between the concentration of the iron powder in the grease for the reduction gear in the durability test and the peak value of the amplitude of the motor current within the particular frequency range corresponding to the specific frequency of the reduction gear, together with FIGS. 4A and 4C to 4E.
Figure 4C:
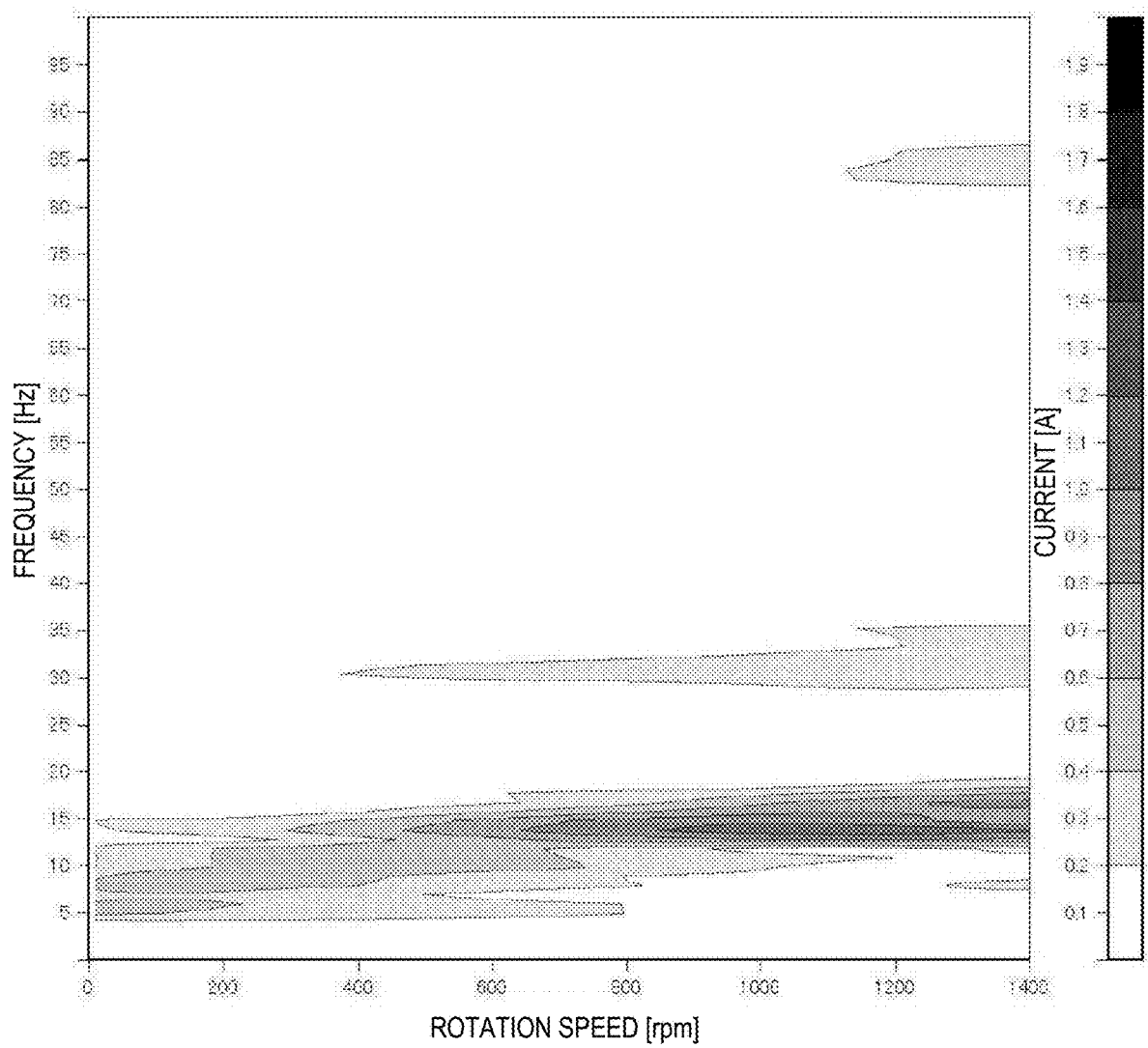
FIG. 4C is a view illustrating the correlation between the concentration of the iron powder in the grease for the reduction gear in the durability test and the peak value of the amplitude of the motor current within the particular frequency range corresponding to the specific frequency of the reduction gear, together with FIGS. 4A, 4B, 4D, and 4E.
Figure 4D:
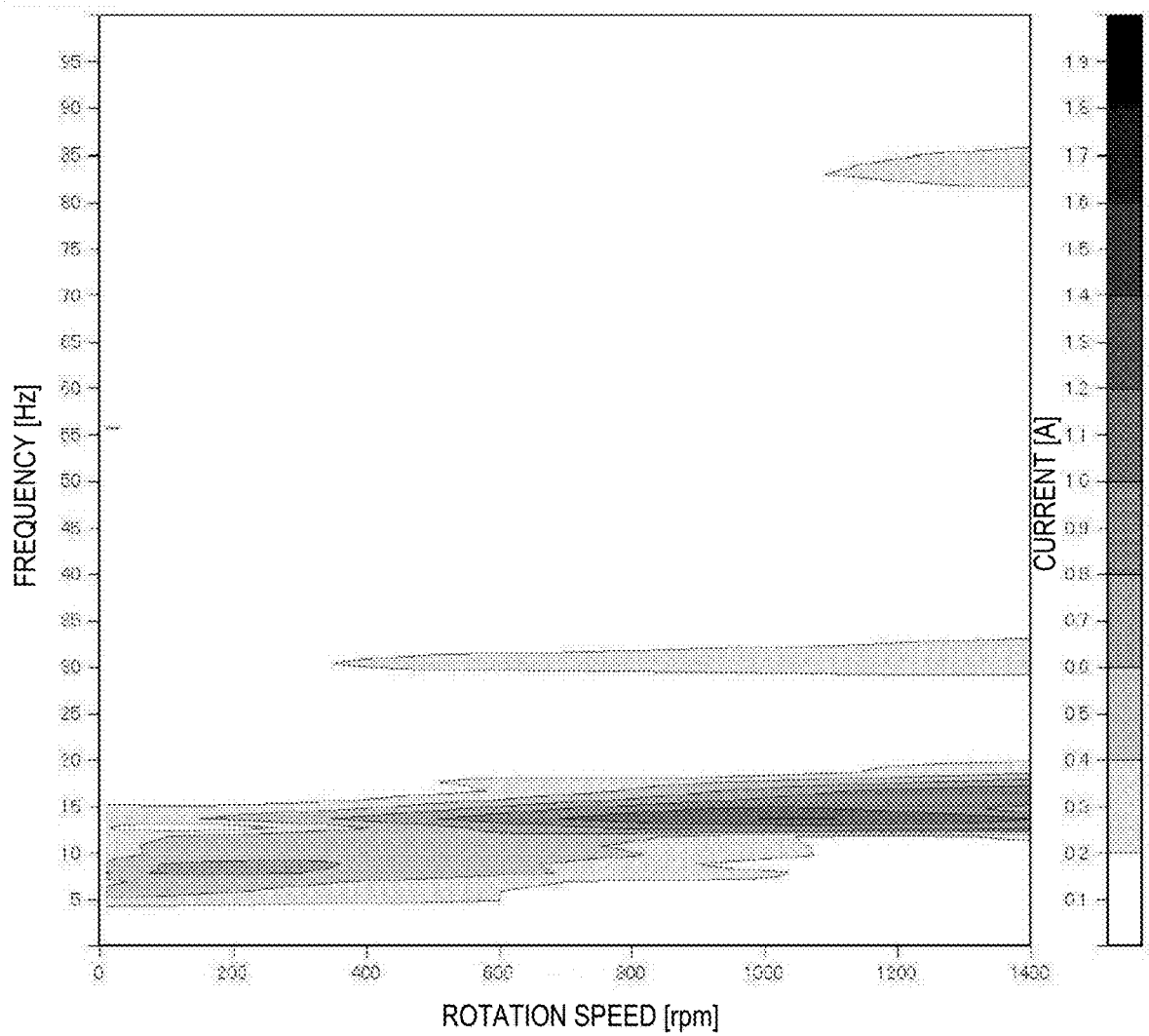
FIG. 4D is a view illustrating the correlation between the concentration of the iron powder in the grease for the reduction gear in the durability test and the peak value of the amplitude of the motor current within the particular frequency range corresponding to the specific frequency of the reduction gear, together with FIGS. 4A to 4C and 4E.
Figure 4E:
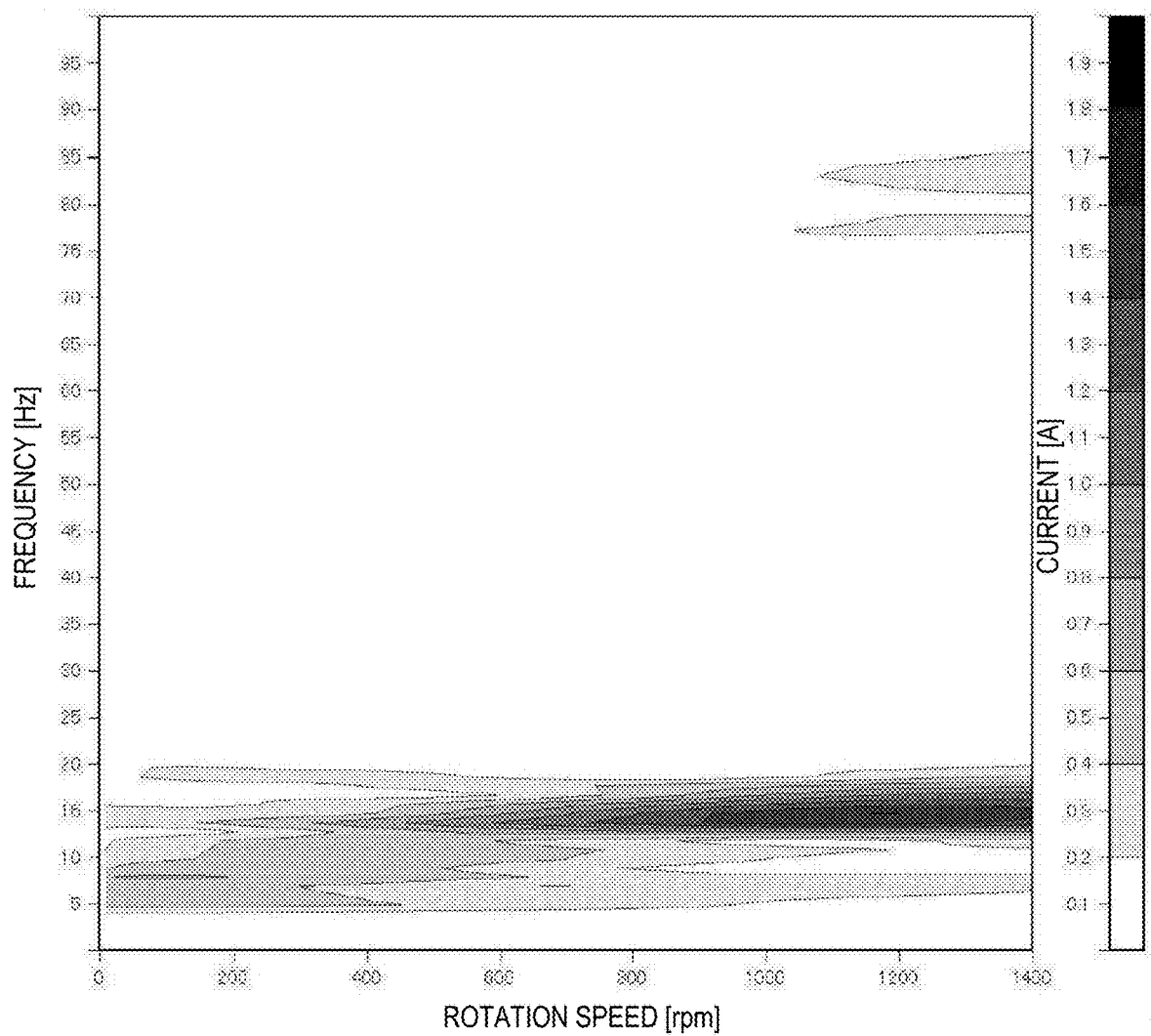
FIG. 4E is a view illustrating the correlation between the concentration of the iron powder in the grease for the reduction gear in the durability test and the peak value of the amplitude of the motor current within the particular frequency range corresponding to the specific frequency of the reduction gear, together with FIGS. 4A to 4D.

FIG. 3 is a flowchart illustrating the operation of the failure diagnosis device of FIG. 1. Referring to FIGS. 1 to 4E, first the mechanical apparatus 11 is operated. In this state, the failure diagnosis device 1 acquires time (cycle) (Step S1).

Moreover, the rotation speed acquiring module 2 acquires the rotation speed of the motor 14 (Step S2).

Moreover, the motor current acquiring module 4 acquires the motor current of the motor 14 (Step S3).

Here, the order of Step S1 (time acquisition), Step S2 (rotation speed acquisition), and Step S3 (motor current acquisition) may be interchanged.

Next, the acceleration/deceleration period identifying module 3 identifies the acceleration/deceleration period based on the rotation speed of the motor acquired by the rotation speed acquiring module 2 (Step S4).

Next, the time series rotation speed data generating module 5 sequentially samples the rotation speed of the motor acquired by the rotation speed acquiring module 2 during the acceleration/deceleration period, and generates the group of time series rotation speed data. Moreover, the time series motor current data generating module 6 sequentially samples the motor current acquired by the motor current acquiring module 4 during the acceleration/deceleration period, and generates the group of time series motor current data (Step S5).

Here, the failure diagnosis device 1 determines the sampling frequency beforehand. Moreover, the number of sampling points in one revolution of the motor is defined.

Next, the FFT analyzing module 7 makes the group of time series motor current data correspond to the group of time series rotation speed data, conducts a frequency analysis of the group of time series motor current data, and generates the frequency spectra 22 of the group of motor current data corresponding to the group of time series rotation speed data 21 (Step S6). Next, the amplitude peak value extracting module 8 extracts the peak value 24 of the amplitude of the motor current within the given frequency range fr corresponding to the given specific frequency f0 of the reduction gear 13 from the frequency spectra 22 of the group of motor current data (Step S7).

Next, the determining module 9 compares the extracted peak value 24 of the amplitude of the motor current with the given amplitude threshold, and then determines whether the reduction gear 13 indicates the sign of failure based on the determination result. Specifically, if the peak value 24 of the amplitude of the motor current is above the given amplitude threshold, the determining module 9 determines that the reduction gear 13 indicates the sign of failure, and if the peak value 24 of the amplitude of the motor current is below the given amplitude threshold, the determining module 9 determines that the reduction gear 13 does not indicate the sign of failure (Step S8).

Operation and Effects

As described above, according to this embodiment, the acceleration/deceleration period during which the operation of the mechanical apparatus 11 accelerates and/or decelerates can be identified. During the acceleration/deceleration period, in the change in the frequency spectrum S of the motor current data with respect to the change in the rotation speed data R of the motor 14, the current amplitude within the particular frequency range fr corresponding to the specific frequency f0 of the reduction gear 13 increases by the resonance of the reduction gear 13, and presents the peak value 24. This peak value 24 has the correlation with the sign of failure of the reduction gear 13. Therefore, it can be determined whether the reduction gear 13 indicates the sign of failure based on the change in the frequency spectrum S of the motor current data with respect to the change in the rotation speed data R of the motor 14. Therefore, the failure diagnosis can be performed during the work of the mechanical apparatus 11 provided with the reduction gear 13.

[Modification 1]

In Modification 1, the failure diagnosis device 1 is configured to determine whether the reduction gear 13 indicates the sign of failure when the motor current is above the given value. The given value is determined by an experiment, a simulation, etc. In FIG. 3, the timing at which the failure diagnosis device 1 determines whether the motor current is above the given value may be any timing as long as the timing is between Step S3 where the motor current is acquired and Step S8 where the existence of the sign of failure is determined.

According to Modification 1, when the load of the reduction gear 13 is large, the existence of the sign of failure is determined. Since the gears mesh firmly when the load of the reduction gear 13 is large, the peak value 24 of the current amplitude within the particular frequency range fr by the resonance of the reduction gear 13 appears more clearly. Therefore, the existence of the sign of failure can be determined more accurately.

[Modification 2]

In Modification 2, the acceleration/deceleration period is used as an acceleration period.

According to Modification 2, the existence of the sign of failure is determined during the acceleration period of the operation of the mechanical apparatus 11. During the acceleration period, since the gears mesh firmly, the peak value 24 of the current amplitude within the particular frequency range fr by the resonance of the reduction gear appears more clearly. Therefore, the existence of the sign of failure can be determined more accurately.

Embodiment 2

A mechanical apparatus 11 according to Embodiment 2 of the present disclosure is provided with the failure diagnosis device 1 for the reduction gear 13 of any one of Embodiment 1, Modification 1 and Modification 2.

According to Embodiment 2, the failure diagnosis can be performed during the work of the mechanical apparatus 11.

Example

The present inventors conducted a durability test of a reduction gear for an industrial robot, in order to examine the validity of the failure diagnosis device and the method of diagnosing the failure of the present disclosure. A reduction gear of the second joint is used as a target of the durability test. In the process of the durability test, the change in the amplitude of the motor current within the particular frequency range corresponding to the specific frequency of the reduction gear with respect to the change in the iron powder concentration of the grease filled in the reduction gear was examined. A 6-axis articulated robot was used as the industrial robot. The durability test was conducted with the robot taking a posture in which a large load is applied to the reduction gear and the motor of the second joint. That is, the robot took the posture in which a robotic arm is stretched substantially horizontally.

Then, an abrasion (worn) state of the reduction gear of the second joint was examined. The examination of the abrasion state was conducted by periodically examining the iron powder concentration of the grease filled in the reduction gear. Moreover, according to the examination of the abrasion state, the 3D frequency analysis (refer to FIG. 2) described above was also conducted for the current instruction value of the motor to drive the reduction gear.

FIGS. 4A to 4E are views illustrating a correlation between the iron powder concentration of the grease for the reduction gear in the durability test and the peak value of the amplitude of the motor current within the particular frequency range corresponding to the specific frequency of the reduction gear. FIGS. 4A to 4E are a view of the iron powder concentration being 0.008 wt %, a view of the iron powder concentration being 0.057 wt %, a view of the iron powder concentration being 0.104 wt %, a view of the iron powder concentration being 0.176 wt %, and a view of the iron powder concentration being 0.290 wt %, respectively. The durability test advances from FIG. 4A to FIG. 4E. In FIGS. 4A to 4E, X-axis expresses the rotation speed (rpm) of the motor, Y-axis expresses the frequency, and a gradation of the image expresses the amplitude (A) of the motor current. The amplitude of the motor current is larger as the image becomes deeper (black), and the amplitude of the motor current is smaller as the image is lighter (white).

Referring to FIGS. 4A to 4E, a range where the amplitude of the motor current is large appears near 14 Hz, and it can be seen that the amplitude of the motor current becomes larger (the image becomes deeper) as the durability test advances. That is, it can be seen that the amplitude of the motor current presents the peak value. Moreover, it can be seen that the iron powder concentration of the grease increases as the durability test advances.

Therefore, from this test result, it was confirmed that in the change in the frequency spectrum of the motor current with respect to the change in the rotation speed of the motor, the current amplitude within the particular frequency range corresponding to the specific frequency of the reduction gear increased to present the well-defined peak value.

In addition, it was confirmed that, during the acceleration period of the acceleration/deceleration period, the current amplitude within the particular frequency range presented the well-defined peak value.

In addition, it was confirmed that the current amplitude within the particular frequency range presented the more-defined peak value as the load current of the motor increased.

Figure 5:
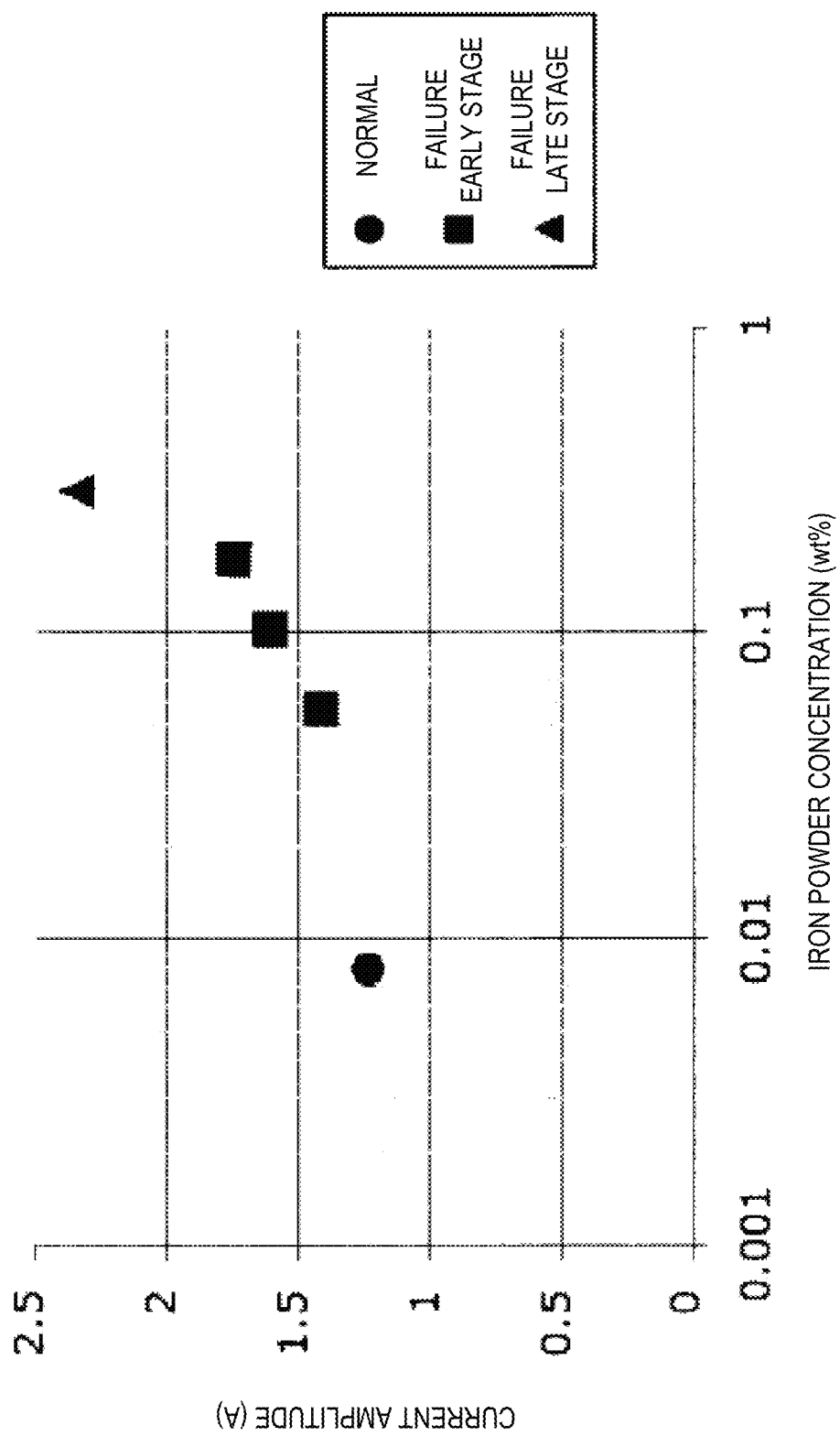
FIG. 5 is a view illustrating the correlation between the iron powder concentration of the grease for the reduction gear in the durability test and the peak value of the amplitude of the motor current within the particular frequency range corresponding to the specific frequency of the reduction gear.

FIG. 5 is a view illustrating the correlation between the iron powder concentration of the grease for the reduction gear in the durability test and the peak value of the amplitude of the motor current within the particular frequency range corresponding to the specific frequency of the reduction gear. In FIG. 5, the horizontal axis expresses the iron powder concentration and the vertical axis expresses the peak value of the amplitude of the motor current. From FIG. 5, it can be seen that a correlation exists between the iron powder concentration of the grease for the reduction gear and the peak value of the amplitude of the motor current within the particular frequency range corresponding to the specific frequency of the reduction gear. In other words, it can be seen that the peak value of the amplitude of the motor current within the particular frequency range correlates with the sign of failure of the reduction gear.

From the result of the durability test, it was proved that it was possible to determine whether the reduction gear indicates the sign of failure based on the change in the frequency spectrum of the motor current with respect to the change in the rotation speed of the motor.

It is apparent for a person skilled in the art that many improvements and other embodiments of the present disclosure are possible from the above description. Therefore, the above description is to be interpreted only as illustration, and it is provided in order to teach a person skilled in the art the best mode that implements the present disclosure. The details of the structures and/or the functions may be changed substantially, without departing from the spirit of the present disclosure.

INDUSTRIAL APPLICABILITY

The failure diagnosis device etc. for the reduction gear of the present disclosure is useful as the failure diagnosis device etc. for the reduction gear which is capable of performing the failure diagnosis during the work of the mechanical apparatus provided with the reduction gear.

DESCRIPTION OF REFERENCE CHARACTERS

1 Failure Diagnosis Device
2 Rotation Speed Acquiring Module

3 Acceleration/Deceleration Period Identifying Module
4 Motor Current Acquiring Module
5 Time Series Rotation Speed Data Generating Module
6 Time Series Motor Current Data Generating Module
7 FFT Analyzing Module
8 Amplitude Peak Value Extracting Module
9 Determining Module
10 Outputting Module
11 Mechanical Apparatus
12 Operating Part
13 Reduction Gear
13a Output Shaft
14 Motor
14a Rotation Shaft
15 Power Converter
16 Encoder
17 Controller
18 Rotation Angle
19 Current
20 Current Instruction Value
21 Group of Time Series Rotation Speed Data
22 Frequency Spectra of Group of Time Series Motor Current Data

The invention claimed is:

1. A failure diagnosis system comprising:
 a mechanical apparatus including:
  a motor;
  a reduction gear driven by the motor, the reduction gear being configured to slow down rotation power of the motor and transmit the rotation power to an operating part of the mechanical apparatus;
  an encoder configured to detect a rotational position of the motor; and
  a sensor configured to detect a motor current supplied to the motor, the motor current being one of load current of the motor and a current value having a correlation with the load current;
 a processor programmed to:
  acquire rotation speed data of the motor based on a signal from the encoder;
  identify an acceleration/deceleration period during which operation of the mechanical apparatus accelerates and/or decelerates based on the acquired rotation speed data based on the signal from the encoder;
  generate a group of time series rotation speed data by sequentially sampling the portion of the acquired rotation speed data from the identified acceleration/deceleration period acquired based on the signal from the encoder;
  acquire a signal indicating the motor current from the sensor;
  generate a group of time series motor current data by sequentially sampling the portion of the acquired signal indicating the motor current from the sensor from the identified acceleration/deceleration period;
  make the group of time series motor current data correspond to the group of time series rotation speed data, conduct a frequency analysis of the group of time series motor current data, and generate frequency spectra of the group of motor current data corresponding to the group of time series rotation speed data;
  extract a peak value of a current amplitude of the motor current within a particular frequency range corresponding to a specific frequency of the reduction gear, from the frequency spectra of the group of motor current data; and
  make a determination of whether the reduction gear indicates a sign of failure induced by abrasion based on a comparison between a given amplitude threshold and the extracted peak value in a change in frequency spectrum of the motor current with respect to a change in a rotation speed of the motor during the acceleration/deceleration period; and
 an outputter that outputs a result of the determination of whether the reduction gear indicates the sign of failure.

2. The failure diagnosis system of claim 1, wherein the given amplitude threshold is an allowable amplitude threshold corresponding to an allowable abrasion amount threshold indicative of an acceptable limit of an amount of abrasion of the reduction gear.

3. The failure diagnosis system of claim 1, wherein the processor makes the determination of whether the reduction gear indicates the sign of failure when the motor current is above a given value.

4. The failure diagnosis system of claim 1, wherein the reduction gear is configured so that an output shaft thereof only rotates within a rotation range less than one revolution in an operating range of the mechanical apparatus.

5. The failure diagnosis system of claim 1, wherein the acceleration/deceleration period is an acceleration period.

6. The failure diagnosis system of claim 1, wherein the acceleration/deceleration period is a deceleration period.

7. The failure diagnosis system of claim 1, wherein the processor and the outputter are included in the mechanical apparatus.

8. A method of diagnosing failure of a reduction gear provided to a mechanical apparatus,
 the mechanical apparatus comprising:
  a motor;
  the reduction gear, the reduction gear being driven by the motor and being configured to slow down rotation power of the motor and transmit the rotation power to an operating part of the mechanical apparatus;
  an encoder configured to detect a rotational position of the motor; and
  a sensor configured to detect a motor current supplied to the motor, the motor current being one of load current of the motor and a current value having a correlation with the load current,
 the method comprising the steps of:
  (a) using a processor to acquire rotation speed data of the motor based on a signal from the encoder;
  (b) using the processor to identify an acceleration/deceleration period during which operation of the mechanical apparatus accelerates and/or decelerates based on the acquired rotation speed data based on the signal from the encoder;
  (c) using the processor to generate a group of time series rotation speed data by sequentially sampling the portion of the acquired rotation speed data from the identified acceleration/deceleration period acquired based on the signal from the encoder;
  (d) using the processor to acquire a signal indicating the motor current from the sensor;
  (e) using the processor to generate a group of time series motor current data by sequentially sampling the portion of the acquired signal indicating the motor current from the sensor from the identified acceleration/deceleration period;
  (f) using the processor to make the group of time series motor current data correspond to the group of time series rotation speed data, conduct a frequency analysis of the group of time series motor current data, and generate frequency spectra of the group of motor current data corresponding to the group of time series rotation speed data;

(g) using the processor to extract a peak value of a current amplitude of the motor current within a particular frequency range corresponding to a specific frequency of the reduction gear, from the frequency spectra of the group of motor current data;

(h) using the processor to make a determination of whether the reduction gear indicates a sign of failure induced by abrasion based on a comparison between a given amplitude threshold and the extracted peak value in a change in frequency spectrum of the motor current with respect to a change in a rotation speed of the motor during the acceleration/deceleration period; and (i) using an outputter to output a result of the determination of whether the reduction gear indicates the sign of failure.

9. The method of claim 8, wherein the given amplitude threshold is an allowable amplitude threshold corresponding to an allowable abrasion amount threshold indicative of an acceptable limit of an amount of abrasion of the reduction gear.

10. The method of claim 8, wherein the processor is used to make the determination of whether the reduction gear indicates the sign of failure when the motor current is above a given value.

11. The method of claim 8, wherein the reduction gear is configured so that an output shaft thereof only rotates within a rotation range less than one revolution in an operating range of the mechanical apparatus.

12. The method of claim 8, wherein the acceleration/deceleration period is an acceleration period.

13. The method of claim 8, wherein the acceleration/deceleration period is a deceleration period.

* * * * *